(12) United States Patent
Shi

(10) Patent No.: US 12,308,983 B2
(45) Date of Patent: May 20, 2025

(54) SYSTEM FOR MANAGING DEVICE POWER CONSUMPTION AND METHOD, DEVICE AND STORAGE MEDIUM

(71) Applicants: QISDA OPTRONICS (SUZHOU) CO. LTD., Suzhou (CN); QISDA (SUZHOU) CO., LTD., Suzhou (CN)

(72) Inventor: Hong Mei Shi, Suzhou (CN)

(73) Assignees: OISDA OPTRONICS (SUZHOU) CO. LTD., Suzhou (CN); QISDA (SUZHOU) CO., LTD., Suzhou (CN)

( * ) Notice: Subject to any disclaimer, the term of this patent is extended or adjusted under 35 U.S.C. 154(b) by 0 days.

(21) Appl. No.: 18/255,191

(22) PCT Filed: Apr. 25, 2022

(86) PCT No.: PCT/CN2022/088967
§ 371 (c)(1),
(2) Date: May 31, 2023

(87) PCT Pub. No.: WO2022/156830
PCT Pub. Date: Jul. 28, 2022

(65) Prior Publication Data
US 2024/0007313 A1    Jan. 4, 2024

(51) Int. Cl.
*H04L 12/12* (2006.01)
*G06F 1/00* (2006.01)
*H04L 12/10* (2006.01)

(52) U.S. Cl.
CPC .............. *H04L 12/12* (2013.01); *H04L 12/10* (2013.01)

(58) Field of Classification Search
CPC ................................ H04L 12/12; H04L 12/10
See application file for complete search history.

(56) References Cited

U.S. PATENT DOCUMENTS

| 2006/0143583 A1 | 6/2006 | Diab et al. |
| 2007/0110360 A1 | 5/2007 | Stanford |

(Continued)

FOREIGN PATENT DOCUMENTS

| CN | 101369899 A | 2/2009 |
| CN | 102480362 A | 5/2012 |

(Continued)

OTHER PUBLICATIONS

International Search Report issued on Jan. 13, 2023, in corresponding International Patent Application No. PCT/CN2022/088967; 5 pages.

(Continued)

*Primary Examiner* — Xuxing Chen
(74) *Attorney, Agent, or Firm* — Maier & Maier, PLLC

(57) ABSTRACT

A system, method, device, and storage medium for managing device power consumption related to the field of Ethernet power supply. The system for includes a power supply mode monitoring module to monitor a power supply mode of power sourcing equipment in real time; a PoE power-saving strategy configuration module to display available power consumption and real-time power consumption data of a powered device and receiving an adjustment operation instruction; and a PoE power consumption estimation module configured to acquire a power consumption limit of the powered device, and estimate the real-time power consumption data and the available power consumption according to an adjustment target corresponding to the adjustment operation instruction provided from the PoE power-saving strategy configuration module, so as to adjust device functions of the powered device. The power supply mode monitoring module can also control the PoE power-saving strategy configuration module and the PoE power consumption estimation module.

12 Claims, 6 Drawing Sheets

(56) References Cited

U.S. PATENT DOCUMENTS

| | | | |
|---|---|---|---|
| 2010/0205466 A1 | 8/2010 | Diab et al. | |
| 2012/0324260 A1 | 12/2012 | Kezuka et al. | |
| 2017/0195179 A1 | 7/2017 | Chan et al. | |
| 2019/0148937 A1* | 5/2019 | Kawamoto | H02J 1/102 307/80 |
| 2019/0278495 A1* | 9/2019 | Klein | G06F 3/0625 |
| 2019/0310291 A1* | 10/2019 | Lee | G01R 21/133 |
| 2021/0334187 A1* | 10/2021 | Sewani | G06F 1/324 |
| 2022/0147134 A1* | 5/2022 | Hauke | G06F 1/3206 |

FOREIGN PATENT DOCUMENTS

| | | |
|---|---|---|
| CN | 105812147 A | 7/2016 |
| CN | 110365495 A | 10/2019 |
| JP | 2020071504 A * | 5/2020 |

OTHER PUBLICATIONS

Office Action issued on Feb. 1, 2024, in corresponding Chinese Application No. 202280001170.4, 13 pages.
Office Action issued on Jul. 31, 2024, in corresponding Chinese Application No. 202280001170.4, 7 pages.

* cited by examiner

PoE power-saving strategy

PoE information:
PoE+ limit: 25.5 W  Used: 13.00 W  Remaining: 12.50 W

LCD backlight brightness (30%, power consumption: 0.90 W)

Speaker volume (25%, power consumption: 0.25 W)

Mobile network
Enable/disable Mobile network. (power consumption: 3.75 W) 

Wi-Fi
Enable/disable Wi-Fi (power consumption: 2.30 W) 

Bluetooth
Enable/disable Bluetooth (power consumption: 1.00 W) 

Thunderbolt USB
Enable/disable Thunderbolt USB (power consumption: 5.60 W) 

USB 3.0
Enable/disable USB 3.0 (power consumption: 4.50 W) 

USB 2.0
Enable/disable USB 2.0 (power consumption: 2.00 W) 

External display
Enable/disable external display (power consumption: 1.00 W) 

Power saving mode of processor
Enable power saving mode of processor (power consumption: 1.20 W) 

Fig. 4

SYSTEM FOR MANAGING DEVICE POWER CONSUMPTION AND METHOD, DEVICE AND STORAGE MEDIUM

TECHNICAL FIELD

The application relates to the technical field of Ethernet power supply, in particular to a system for managing device power consumption and method, a device and a storage medium.

BACKGROUND

PoE technology is used more and more widely, and switches supporting PoE are increasingly common, such as switches produced by Cisco and Huawei. In recent years, especially in the European and American markets, there are more and more electronic products such as tablet computers, notebook computers or all-in-one computers that support PoE and have no batteries.

The PoE technology is used mainly in the following two scenarios:
1) In a scenario where a power adapter cannot be used due to the absence of power lines, the PoE technology can be used to supply power to electronic products such as tablet computers, notebook computers or all-in-one computers; and
2) In a scenario of a power failure, a PoE power supply mode is automatically activated to supply power to electronic products such as tablet computers, notebook computers or all-in-one computers by means of the PoE technology.

However, when the PoE technology is used for power supply, if the power consumption of a powered device exceeds the power supply limit of power sourcing equipment, the powered device, especially devices without batteries, will not work normally. The situations that the device cannot work normally include but are not limited to:
1) being unable to boot normally;
2) automatically shutting down; and
3) rebooting cyclically.

SUMMARY

The application provides a system for managing device power consumption and method, a device and a storage medium, which can flexibly configure a power-saving strategy according to the functions of a powered device and the needs of users when PoE is used for power supply, thereby ensuring that the powered device can work stably under limited power supply capacity.

According to one aspect of the application, a system for managing device power consumption is provided, comprising: a power supply mode monitor configured to monitor a power supply mode of power sourcing equipment in real time; a PoE power-saving strategy configurator configured to display available power consumption and real-time power consumption data of a powered device and receive an adjustment operation instruction; and a PoE power consumption estimator configured to acquire a power consumption limit of the powered device, and estimate the real-time power consumption data and the available power consumption according to an adjustment target corresponding to the adjustment operation instruction provided from the PoE power-saving strategy configurator, so as to adjust device functions of the powered device; wherein the power supply mode monitor is further configured to control the PoE power-saving strategy configurator and the PoE power consumption estimator according to the power supply mode of the power sourcing equipment.

According to some embodiments, monitoring a power supply mode of power sourcing equipment in real time comprises: setting a power supply mode determination signal; and determining whether the power supply mode of the power sourcing equipment is a PoE mode or a non-PoE mode according to a level of the determination signal.

According to some embodiments, monitoring a power supply mode of power sourcing equipment in real time further comprises: if the power supply mode of the power sourcing equipment is a PoE mode, enabling, by the power supply mode monitor, the PoE power consumption estimator and the PoE power-saving strategy configurator; and if the power supply mode of the power sourcing equipment is a non-PoE mode, disabling, by the power supply mode monitor, the PoE power consumption estimator and the PoE power-saving strategy configurator.

According to some embodiments, the available power consumption comprises: first available power consumption calculated and acquired according to a power consumption limit of a PoE specification and the power consumption limit of the powered device; and second available power consumption estimated and acquired according to the adjustment target and the first available power consumption.

According to some embodiments, estimating the real-time power consumption data comprises: acquiring performance parameters of the powered device; and obtaining the real-time power consumption data of the powered device by estimation according to the performance parameters and empirical data.

According to some embodiments, the adjustment target comprises: performance adjustment of the device functions of the powered device; and/or on or off of the device functions of the powered device.

According to some embodiments, acquiring the power consumption limit of the powered device comprises: sending, by the powered device, an application for power allocation to the power sourcing equipment through an LLDP protocol; and acquiring power information allocated to the powered device returned from the power sourcing equipment.

According to one aspect of the application, a method for managing device power consumption based on power supply in a PoE mode is provided, comprising: monitoring a power supply mode of power sourcing equipment in real time, and acquiring a power consumption limit of a powered device under a condition that the power supply mode of the power sourcing equipment is the PoE mode; receiving an adjustment operation instruction from a user, and setting an adjustment target according to the adjustment operation instruction; estimating available power consumption and real-time power consumption data of the powered device according to the power consumption limit of the powered device and the adjustment target; and adjusting device functions of the powered device based on the available power consumption and the real-time power consumption data, and displaying adjusted available power consumption and adjusted real-time power consumption data.

According to some embodiments, managing and displaying the device functions of the powered device comprises: managing the device functions of the powered device by using a default power consumption configuration; and setting the device functions of the powered device in the default power consumption configuration according to the available power consumption and the power consumption data of the device functions of the powered device.

According to some embodiments, a method for managing device power consumption based on power supply in a PoE mode also comprising enabling, with the default power consumption configuration in the PoE mode, the device functions of the powered device to a maximum extent according to the power consumption limit of the powered device; and changing the default power consumption configuration according to changes of the powered device and the power consumption limit of the powered device.

According to some embodiments, the device functions of the powered device are set in descending order of the power consumption data of the device functions or according to user requirements.

According to one aspect of the application, an electronic device is provided, comprising: one or more processors; and a storage apparatus configured to store one or more programs, wherein when the one or more programs are executed by the one or more processors, the one or more processors implement the method as described above.

According to one aspect of the application, a computer-readable storage medium on which a computer program is stored is provided, and the program, when executed by a processor, implements the method as described above.

According to the embodiments of the application, a power consumption protection mechanism is indirectly provided by setting the PoE power-saving strategy, so as to effectively prevent the power consumption of the system from exceeding a PoE power consumption limit due to the activation of too many functions of the electronic device.

It should be understood that the above general description and the following detailed description are only exemplary, and do not limit the application.

BRIEF DESCRIPTION OF THE DRAWINGS

In order to more clearly explain the technical schemes in the embodiments of this application, the drawings needed in the description of the embodiments will be briefly introduced below. Obviously, the drawings in the following description are only some embodiments of this application.

FIG. 4 shows an interactive diagram of a PoE power-saving strategy according to an exemplary embodiment of the application.

DETAILED DESCRIPTION OF EMBODIMENTS

Figure 1:
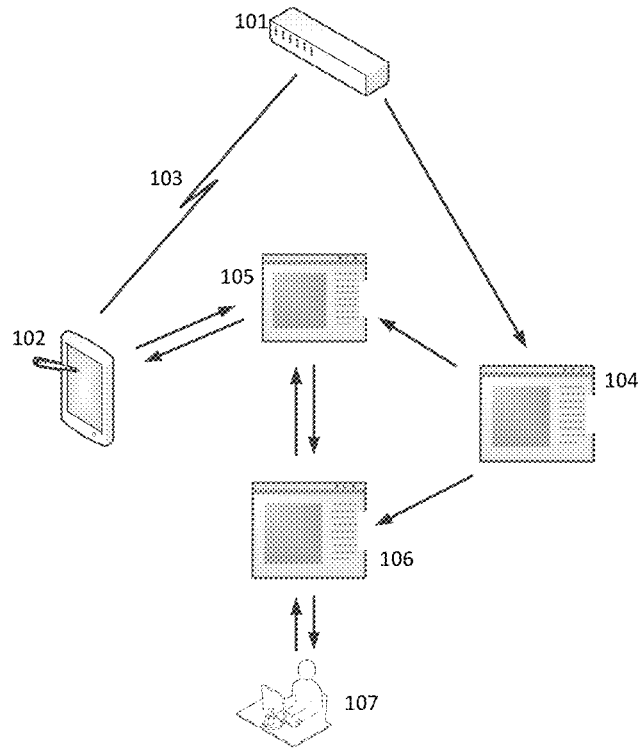
FIG. 1 shows a diagram of a system for managing device power consumption according to an exemplary embodiment of the application.

Exemplary embodiments will be described more fully below with reference to the accompanying drawings. However, the exemplary embodiments can be implemented in various forms and should not be construed as being limited to the embodiments set forth herein. These embodiments are provided to make this application more thorough and complete, and to fully convey the concept of the exemplary embodiments to those skilled in the art. In the drawings, the same reference numerals refer to the same or similar parts, so repeated descriptions will be omitted.

The described features, structures, or characteristics may be combined in any suitable manner in one or more embodiments. In the following description, numerous specific details are provided to give a thorough understanding of the embodiments of the disclosure. However, those skilled in the art will realize that the technical solution of the disclosure can be practiced without one or more of these specific details, or other ways, components, materials, devices or operations can be adopted. In these cases, well-known structures, methods, devices, implementations, materials or operations will not be shown or described in detail.

The flowchart shown in the drawings is only an exemplary illustration, and does not necessarily include all contents and operations/steps, nor does it have to be executed in the described order. For example, some operations/steps can be decomposed, while some operations/steps can be combined or partially combined, so the actual execution order may change according to the actual situation.

Terms such as "first" and "second" in the specification and claims of this application and the drawings are used to distinguish different objects rather than to describe a specific order. Further, the terms "comprise" and "have" and any variations thereof are intended to cover non-exclusive inclusion. For example, a process, method, system, product or device comprising a series of steps or units is not limited to the listed steps or units, but optionally comprises steps or units not listed, or optionally comprises other steps or units inherent to the process, method, product or device.

The application provides a system for managing device power consumption and method, a device and a storage medium, which are used for managing the functions of a powered device by setting a PoE power-saving strategy under the condition of POE power supply, thereby ensuring the stability of the system.

A method for managing device power consumption according to an embodiment of the application will be described in detail below with reference to the attached drawings.

Term Explanation:

Power over Ethernet (POE): it is technology that transmits electric power and network data to devices through network cables in Ethernet. It was initially used for allowing small network devices such as IP phones, WLAN access points and webcams to directly obtain power from Ethernet.

PoE specification (IEEE 802.3): it is a set of standards of the Institute of Electrical and Electronics Engineers, which defines the media access control (MAC) of a physical layer and a data link layer of wired Ethernet, and generally involves local area network (LAN) technology with some wide area network (WAN) applications, which allows physical connection to be established between nodes and/or infrastructure equipment (hubs, switches, routers) through various types of copper cables or optical cables. Available power consumption obtained in the standards of IEEE 802.3 is as follows:

1) PoE (802.3af, type 1): 12.95 W;
2) PoE+(802.3at, type 2): 25.50 W;
3) PoE++(802.3bt, type 3): 51 W;
4) PoE++(802.3bt, type 4): 71 W.

Power Sourcing Equipment (PSE): it provides power in a PoE system.

Powered Device (PD): it uses power in a PoE system.

Link Layer Discovery Protocol (LLDP): it is a data link layer protocol. A network device can inform other devices of its own status by sending a Link Layer Discovery Protocol Data Unit (LLDPDU) in a local network. LLDP is a protocol that enables devices in a network to discover each other, inform each other of their own status and exchange information.

FIG. 1 shows a diagram of a system for managing device power consumption according to an exemplary embodiment of the application.

As shown in FIG. 1, the system for managing device power consumption comprises power sourcing equipment 101, a powered device 102, a communication link 103, a power supply mode monitor 104, a PoE power consumption estimator 105, a PoE power-saving strategy configurator 106 and an interactive interface 107.

It should be understood that the number of devices and modules in FIG. 1 is only schematic. There can be any number of devices and modules according to actual needs.

The power sourcing equipment 101 comprises an Ethernet switch, a router, a hub or other network switching devices supporting the PoE function, and a power adapter.

The powered device 102 comprises an electronic device such as a tablet computer, a notebook computer or an all-in-one computer that supports the PoE function.

According to some embodiments, the electronic device supporting the PoE function comprises an electronic device that has no battery.

A medium used by the communication link 103 to provide a network communication link between the power sourcing equipment 101 and the powered device 102 may be of various connection types, such as optical fiber cables and wireless communication links.

According to some embodiments, the powered device 102 sends an application for power allocation to the power sourcing equipment 101 via the communication link 103 through the LLDP protocol, and acquires power information allocated to the powered device 102 returned from the power sourcing equipment 101.

Generally, the power allocated to the powered device 102 is allocated by the power sourcing equipment 101 according to a power consumption limit in the PoE specification corresponding to the parameters of the power sourcing equipment.

For example, if the power sourcing equipment 101 supports the PoE (IEEE802.3af) standard, the power that the power sourcing equipment 101 can allocate is 12.95 W.

The power supply mode monitor 104 sets a power supply mode determination signal, and determines a power supply mode of the power sourcing equipment 101 according to a level of the determination signal.

According to some embodiments, the power supply mode determination signals include an AC IO signal and a PoE IO signal, wherein when both the AC IO signal and the PoE IO signal are at a high level, power is supplied by the power adapter;

when the AC IO signal is at a high level and the PoE IO signal is at a low level, power is supplied by the power adapter; and when the AC IO signal is at a low level and the PoE IO signal is at a high level, power is supplied in the PoE mode.

Generally, the power supply mode determination signals AC IO signal and PoE IO signal will not be at a low level at the same time.

The PoE power consumption estimator 105 is used for acquiring a power consumption limit of the powered device 102 in the PoE mode and calculating first available power consumption, and acquiring an adjustment target of a PoE power-saving strategy through the PoE power-saving strategy configurator 106 and estimating power consumption data and second available power consumption of device functions in an adjusted PoE power-saving strategy.

According to some embodiments, the PoE power consumption estimator 105 acquires currently used power consumption through a plurality of powered devices including the powered device 102, and calculates the first available power consumption in combination with the current power consumption limit of the PoE specification.

Further, the PoE power consumption estimator 105 estimates power consumption data and remaining the second available power consumption of the device functions of the powered device 102 after performance adjustment (such as adjustment of LCD backlight brightness) and/or on or off of functions (such as on or off of the Bluetooth function) according to the first available power consumption and the adjustment target set by a user sent by the PoE power-saving strategy configurator 106.

The PoE power-saving strategy configurator 106 is used for displaying the power consumption data of the device functions of the powered device 102 on the interactive interface 107 according to the first available power consumption and the second available power consumption. The user can operate through the interactive interface 107 and configure a device function adjustment target of the powered device. The PoE power-saving strategy configurator 106 receives an instruction from the user through the interactive interface 107 and sends the device function adjustment target to the PoE power consumption estimator 105.

According to some embodiments, the PoE power consumption estimator 105 acquires the performance parameters of the powered device 102, and estimates the power consumption data of the device functions of the powered device 102 in the PoE power-saving strategy configurator 106 according to empirical data.

For example, the performance parameters of the powered device 102 include liquid crystal display (LCD) backlight brightness, network connection condition, USB interface use condition and speaker volume, etc. If the LCD backlight brightness is 30%, LCD backlight power consumption is estimated to be 0.90 W according to empirical data.

The user can turn off or on the device functions of the powered device in the interactive interface 107 according to his/her own using habits. The PoE power-saving strategy configurator 106 responds to the operation of the user and feeds data back to the PoE power consumption estimator 105 and the powered device 102 to prevent the power consumption of the system from exceeding a PoE limit due to the activation of too many functions.

According to some embodiments, the functions of the powered devices controlled in the PoE power-saving strategy configurator 106 cannot be turned on or off by other systems or modules.

Figure 2:
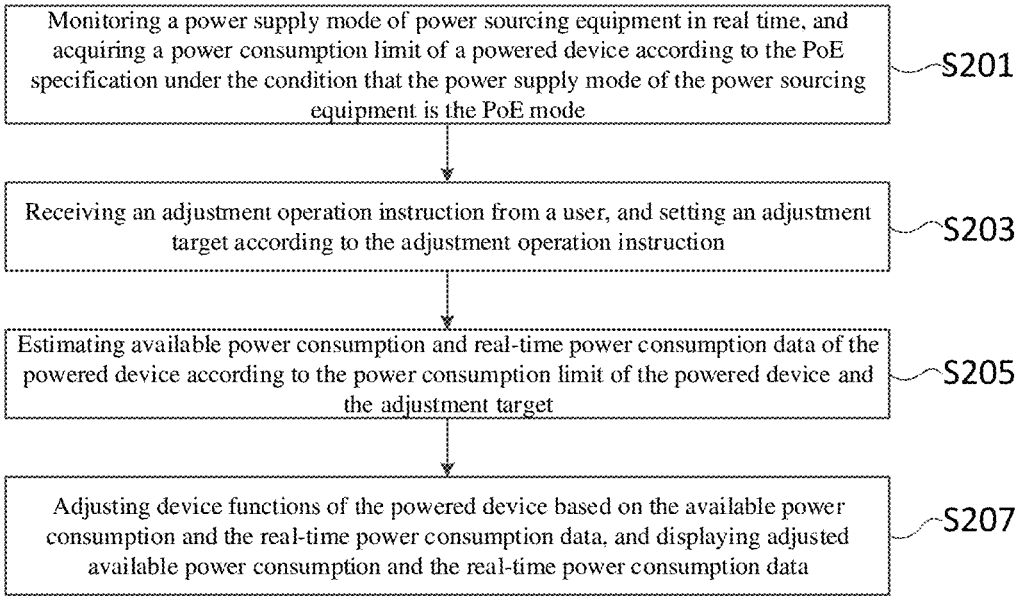
FIG. 2 shows a flowchart of a method for managing device power consumption according to an exemplary embodiment of the application.

FIG. 2 shows a flowchart of a method for managing device power consumption according to an exemplary embodiment of the application.

As shown in FIG. 2, in S201, monitoring a power supply mode of power sourcing equipment in real time, and acquiring a power consumption limit of a powered device under a condition that the power supply mode of the power sourcing equipment is the PoE mode.

According to some embodiments, the power supply mode of the power sourcing equipment is determined first through a power supply mode monitor, and if power is supplied in the PoE mode, the power consumption limit of the powered device is acquired through the LLDP protocol according to the PoE specification supported by the power sourcing equipment.

In S203, receiving an adjustment operation instruction from a user, and setting an adjustment target according to the adjustment operation instruction.

According to some embodiments, the user acquires available power consumption and real-time power consumption data of the powered device through a PoE power-saving strategy configurator, and operates according to his/her own needs to set a device function adjustment target of the powered device.

Further, the PoE power-saving strategy configurator transmits the device function adjustment target to a PoE power consumption estimator according to an operation instruction of the user.

In S205, estimating available power consumption and real-time power consumption data of the powered device according to the power consumption limit of the powered device and the adjustment target.

According to some embodiments, the PoE power consumption estimator acquires first available power consumption by calculating a difference between the power that can be provided by the power sourcing equipment and the power obtained by the powered device under the PoE specification.

Further, second available power consumption is estimated according to the first available power consumption and the setting of the device functions of the powered device in the PoE power-saving strategy configurator.

Generally, the PoE power-saving strategy configurator and the PoE power consumption estimator are enabled when the power supply mode is the PoE mode, and disabled when the power supply mode is not PoE mode (such as power adapter).

The device functions of the powered device in the PoE power-saving strategy configurator include, but are not limited to, adjustment of LCD backlight brightness, enabling/disabling of a mobile network, enabling/disabling of Wi-Fi, enabling/disabling of Bluetooth, enabling/disabling of USB, adjustment of speaker volume, enabling/disabling of an external display and enabling of a power saving mode of a processor.;

Generally, the power saving mode of the processor is enabled by default when specific power consumption cannot be allocated through the LLDP protocol due to large power consumption of the powered device.

Theoretically, only when the power sourcing equipment only supports the PoE (IEEE802.3af) standard and the maximum power consumption that can be allocated to the powered device is 12.95 W can the power saving mode of the processor be enabled.

According to the device function parameters of the powered device and empirical data, the PoE power consumption estimator estimates the real-time power consumption data of the device functions of the powered device.

In S207, adjusting device functions of the powered device based on the available power consumption and the real-time power consumption data, and displaying adjusted available power consumption and adjusted real-time power consumption data.

According to some embodiments, the device functions of the powered device can be managed and adjusted by using a default power consumption configuration, which enables the functions of the powered device to the maximum extent according to the power consumption limit of the powered device.

Generally speaking, the product specifications and power consumption of different powered devices are different, and the default power consumption configurations adopted are also different due to different levels of allocatable power consumption under different PoE specifications and different user needs.

For example, for Elo i-series 4.0 and a 10-inch device, the default configuration under the PoE+ (IEEE 802.3at) standard is as follows:

LCD backlight brightness: 80%;
Thunderbolt USB: off;
USB 3.0: off;
USB 2.0: off;
Bluetooth: on;
Wi-Fi: off;
Speaker volume: 50%;
External display: off;
Power saving mode of processor: off.

For another example, for Elo i-series 4.0 and a 22-inch device, the default configuration under the PoE+ (IEEE 802.3at) standard is as follows:

LCD backlight brightness: 70%;
Thunderbolt USB: off;
USB 3.0: off;
USB 2.0: off;
Bluetooth: on;
Wi-Fi: off;
Speaker volume: 0;
External display: off;
Power saving mode of processor: off.

According to some embodiments, the user can adjust the device functions in the default power consumption configuration, including turning off or on some functions, according to his/her own using habits, the available power consumption under the PoE specification supported by the power sourcing equipment and the real-time power consumption data of the device functions in the PoE power-saving strategy configurator.

Further, after the device function adjustment of the powered device is completed, the adjusted available power and the real-time power consumption data of the device functions are displayed to the user through the PoE power-saving strategy configurator.

Figure 3:
FIG. 3 shows a flowchart of enabling a PoE power-saving strategy according to an exemplary embodiment of the application.

FIG. 3 shows a flowchart of enabling a PoE power-saving strategy according to an exemplary embodiment of the application.

As shown in FIG. 3, the powered device is started, whether the power sourcing equipment supplies power in the PoE mode is determined first through the power supply mode monitor, and if yes, the PoE power-saving strategy is enabled.

Generally speaking, the PoE power-saving strategy can be adjusted according to the power consumption data in the device functions of the powered device from high to low, or according to the actual needs of the user.

As shown in the embodiment of FIG. 3, the PoE power-saving strategy is enabled, and LCD backlight brightness adjustment is performed first because the power consumption of LCD backlight brightness is the largest.

After the LCD backlight brightness adjustment is completed, whether to enable or disable a Thunderbolt USB channel, a USB3.0 channel and a USB2.0 channel are determined in turn according to the PoE power-saving strategy, and functional configuration of a USB interface is performed.

After the USB interface configuration, network connection configuration is performed, including enabling or disabling a mobile network and Wi-Fi.

If the mobile network is disabled, the powered device is switched to an airplane mode.

Further, whether Bluetooth is enabled or not is determined.

Further, whether to switch the processor to the power saving mode is determined according to the PoE specification supported by the power sourcing equipment.

Finally, speaker volume adjustment is performed, so that the PoE power-saving strategy is enabled.

FIG. 4 shows an interactive diagram of a PoE power-saving strategy according to an exemplary embodiment of the application.

As shown in FIG. 4, the user configures the device functions of the powered device through an interactive submodule interface of the PoE power-saving strategy.

Under the PoE+(IEEE 802.3at) standard, the power consumption provided by the power sourcing equipment is 25.5 W, of which 13.00 W has been used and the available power consumption is 12.50 W.

As shown in FIG. 4, the default settings and estimated power consumption data of the powered device are as follows:

LCD backlight brightness: 30%, power consumption: 0.90 W;
Speaker volume: 25%, power consumption: 0.25 W;
Mobile network: off, power consumption: 3.25 W;
Wi-Fi: off, power consumption: 2.80 W;
Bluetooth: off, 1.00 W;
Thunderbolt USB: off, power consumption: 5.60 W;
USB 3.0: off, power consumption: 4.50 W;
USB 2.0: off, power consumption: 2.00 W;
External display: off, power consumption: 1.00 W;
Power saving mode of processor: off, power consumption: 1.20 W.

The user can adjust corresponding functions, such as turning them off or on. The PoE power-saving strategy configurator responds to the operation of the user and sends instructions, and makes the powered device adjust its own functions. That is, the PoE power-saving strategy provides a power consumption protection mechanism for the powered device, which prevents instability caused by the power consumption exceeding the power consumption limit in the PoE specification due to the activation of too many functions of the powered device.

Figure 5:
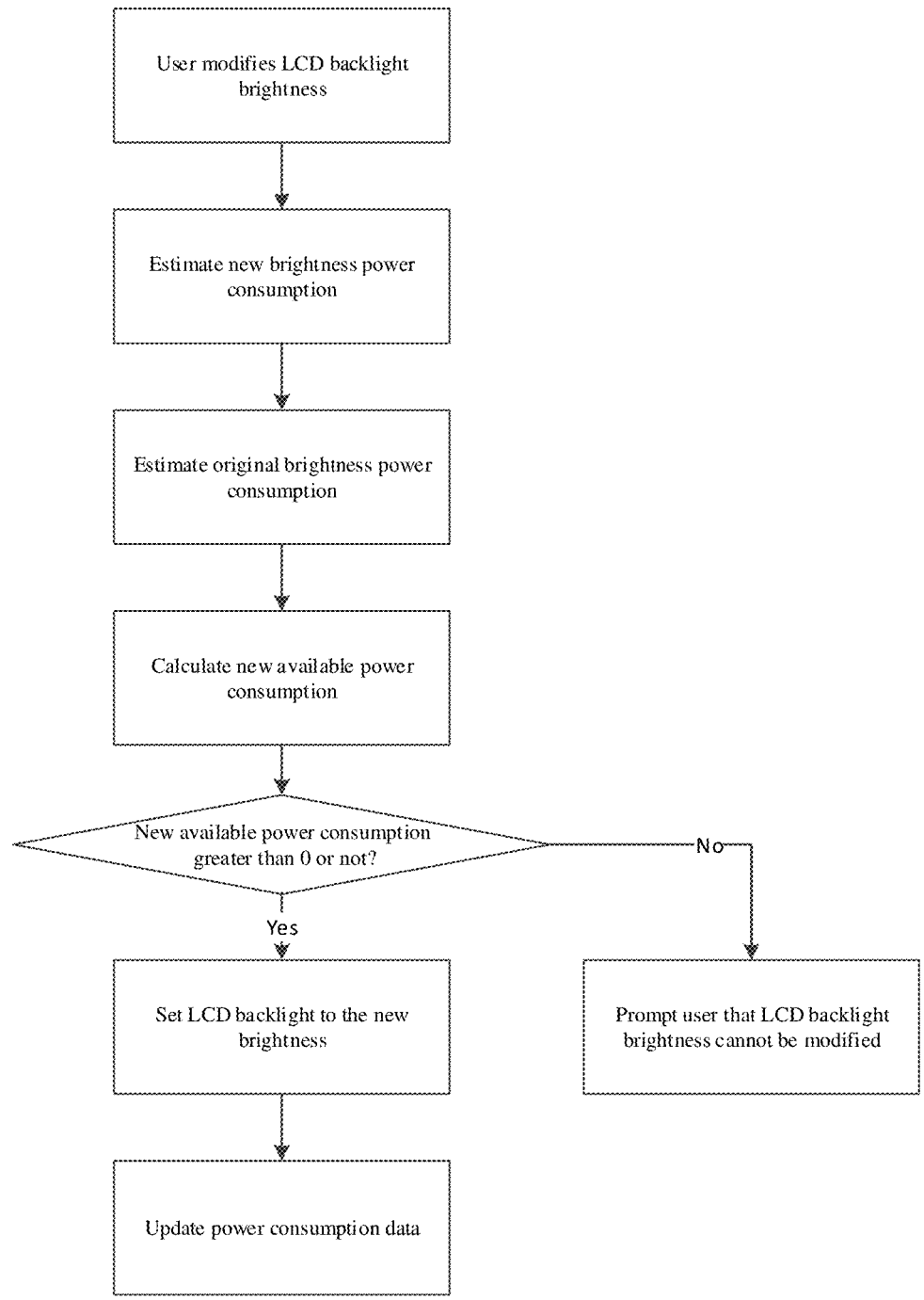
FIG. 5 shows a flowchart of managing the functions of a powered device based on a PoE power-saving strategy according to an embodiment.

FIG. 5 shows a flowchart of managing the functions of a powered device based on a PoE power-saving strategy according to an embodiment.

As shown in FIG. 5, the user modifies the LCD backlight brightness of the powered device through an interactive submodule in the PoE power-saving strategy configurator.

The PoE power-saving strategy configurator transmits the new brightness data obtained after modification and original brightness data to the PoE power consumption estimator.

The PoE power consumption estimator estimates new brightness power consumption according to the new brightness data, and estimates original brightness power consumption according to the original brightness data.

According to the new brightness power consumption, the original brightness power consumption and the current available power consumption, new available power consumption is calculated, that is, new available power consumption=current available power consumption+original brightness power consumption−new brightness power consumption.

If the new available power consumption is greater than 0, information is sent to the powered device, the LCD backlight of the powered device is set to the new brightness, and the current power consumption data of the powered device are updated.

If the new available power consumption is less than or equal to 0, the user is prompted through the interactive submodule in the PoE power-saving strategy configurator that the LCD backlight brightness cannot be modified.

For example, according to the information in the interactive submodule interface of the PoE power-saving strategy as shown in FIG. 4, the power consumption provided by the power sourcing equipment is 25.5 W, of which 13.00 W has been used and 12.50 W is available.

Assuming that the Thunderbolt USB, USB3.0 and USB2.0 are all enabled and in a working state currently and the respective estimated power consumption is 5.60 W, 4.50 W and 2.00 W, the current LCD backlight brightness is 30% and the estimated power consumption is 0.90 W, the current available power consumption is calculated, that is, based on the available power consumption of the current power sourcing equipment and the power consumption of the currently enabled functions, the current available power consumption=12.50 W−5.60 W−4.50 W−2.00 W=0.40 W.

If the user tries to adjust the LCD backlight brightness to 70% and the estimated power consumption is 3.20 W, then the new available power consumption=0.40 W+0.90 W−3.20 W=−1.90 W<0.

It can be seen that the new available power consumption is less than 0, and the interactive submodule interface of the PoE power-saving strategy displays the prompt message of "exceed PoE power consumption limit", so the user cannot adjust the LCD backlight brightness to 70%, but can make the adjustment again after disabling some other functions.

Figure 6:
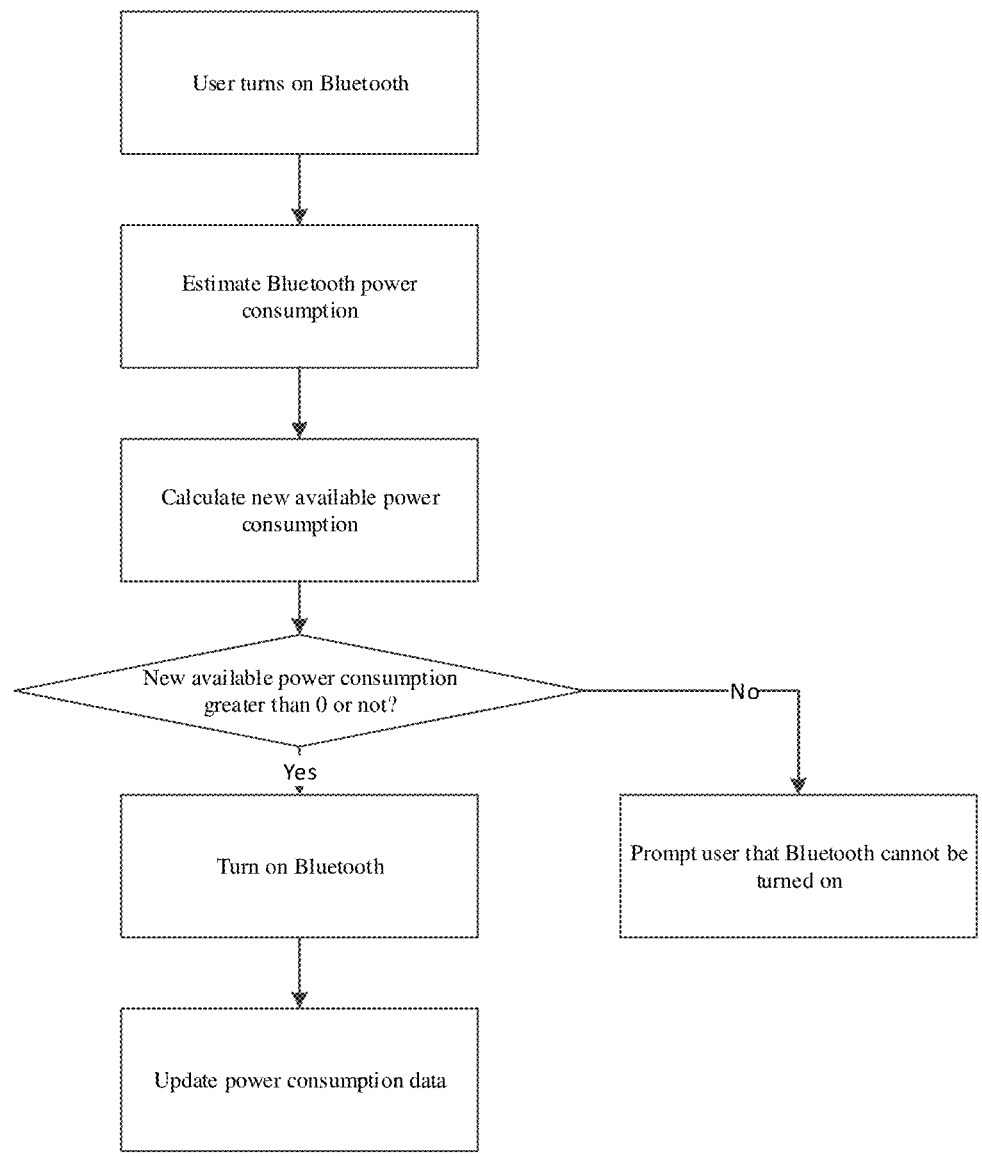
FIG. 6 shows a flowchart of managing the functions of a powered device based on a PoE power-saving strategy according to another embodiment.

FIG. 6 shows a flowchart of managing the functions of a powered device based on a PoE power-saving strategy according to another embodiment.

As shown in FIG. 6, the user enables the Bluetooth function of the powered device through the interactive submodule in the PoE power-saving strategy configurator.

The PoE power-saving strategy configurator sends data to the PoE power consumption estimator, and the PoE power consumption estimator estimates the power consumption of the Bluetooth function.

According to the power consumption of the Bluetooth function and the current available power consumption, the new available power consumption is calculated, that is, the new available power consumption=current available power consumption−Bluetooth power consumption.

If the new available power consumption is greater than 0, information is sent to the powered device, the Bluetooth function of the powered device is enabled, and the existing power consumption data of the powered device are updated.

If the new available power consumption is less than or equal to 0, the user is prompted through the interactive submodule in the PoE power-saving strategy configurator that adjustment or modification cannot be made.

For example, according to the information in the interactive submodule interface of the PoE power-saving strategy as shown in FIG. 4, the power consumption provided by the power sourcing equipment is 25.5 W, of which 13.00 W has been used and 12.50 W is available.

Assuming that the Thunderbolt USB, USB3.0 and USB2.0 are all enabled and in a working state currently and the respective estimated power consumption is 5.60 W, 4.50 W and 2.00 W, the current LCD backlight brightness is 30% and the estimated power consumption is 0.90 W, the current available power consumption is calculated, that is, based on the available power consumption of the current power sourcing equipment and the power consumption of the currently enabled functions, the calculated current available power consumption=12.50 W−5.60 W−4.50 W−2.00 W=0.40 W.

If the user tries to enable the Bluetooth function and the estimated power consumption is 1.00 W, then the calculated new available power consumption=0.40 W−1.00 W=−0.60W<0.

It can be seen that the new available power consumption is less than 0, and the interactive submodule interface of the PoE power-saving strategy displays the prompt message of "exceed PoE power consumption limit", so the user cannot enable the Bluetooth function, but can try it again after disabling some other functions.

Figure 7:
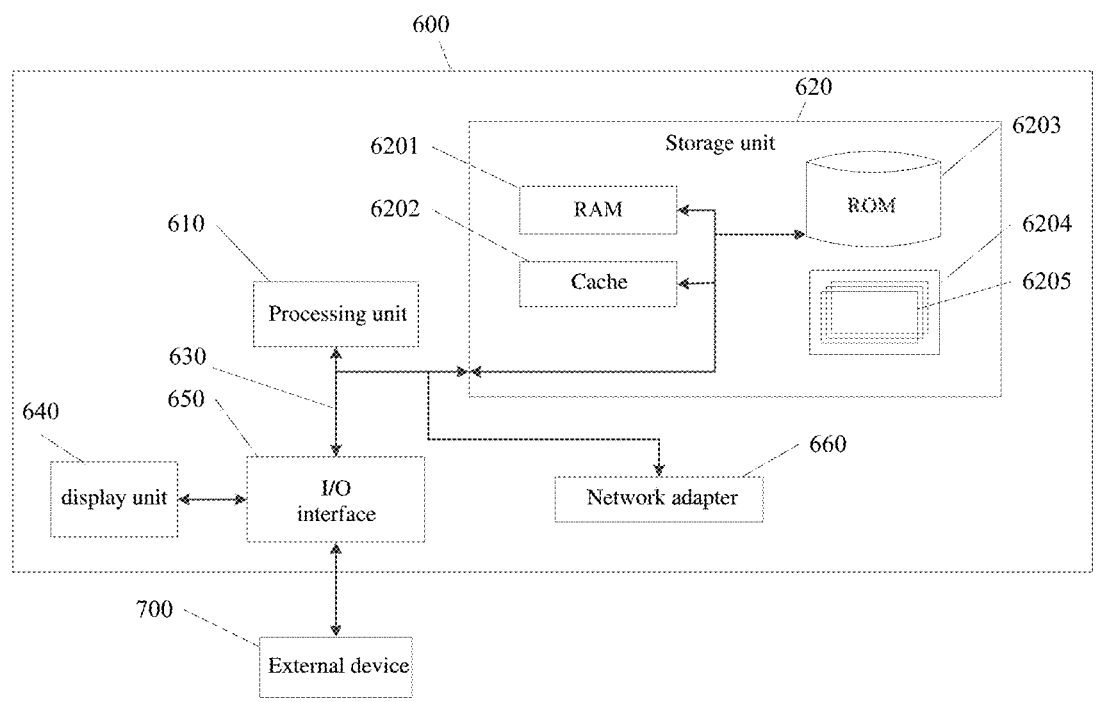
FIG. 7 shows a block diagram of an electronic device according to an exemplary embodiment of the application.

FIG. 7 shows a block diagram of an electronic device according to an exemplary embodiment of the application.

As shown in FIG. 7, electronic equipment 600 is just an example, and should not bring any limitation to the function and application scope of the embodiments of the application.

As shown in FIG. 7, the electronic device 600 is represented in the form of a general-purpose computing device. Components of the electronic device 600 may include, but are not limited to, at least one processing unit 610, at least one storage unit 620, a bus 630 connecting different system components (including the storage unit 620 and the processing unit 610), a display unit 640, etc. The storage unit stores a program code, and the program code can be executed by the processing unit 610, so that the processing unit 610 implements the methods described in this specification according to various exemplary embodiments of the application. For example, the processing unit 610 may perform the method as shown in FIG. 2.

The storage unit 620 may include a computer-readable medium in the form of a volatile memory, such as a random access memory (RAM) 6201 and/or a cache memory 6202, and may further include a read-only memory (ROM) 6203.

The storage unit 620 may also comprise a program/utility tool 6204 with a group of (at least one) program modules 6205, such program modules 6205 include but are not limited to: an operation system, one or more application programs, other program modules and program data, and each or some combination of these examples may include the implementation of a network environment.

The bus 630 may represent one or more of several types of bus structures, including memory cell bus or memory cell controller, peripheral bus, graphics acceleration port, processing unit or local bus using any of a variety of bus structures.

The electronic device 600 can also communicate with one or more external devices 700 (e.g., keyboard, pointing device, Bluetooth device, etc.), with one or more devices that enable users to interact with the electronic device 600, and/or with any device that enables the electronic device 600 to communicate with one or more other computing devices (e.g., routers, modems, etc.). This communication can be performed through an input/output (I/O) interface 650. Further, the electronic device 600 can also communicate with one or more networks (such as a local area network (LAN), a wide area network (WAN) and/or a public network, such as the Internet) through a network adapter 660. The network adapter 660 can communicate with other modules of the electronic device 600 through a bus 630. It should be understood that although not shown in the figure, other hardware and/or software modules can be used in conjunction with the electronic device 600, including but not limited to microcodes, device drivers, redundant processing units, external disk drive arrays, RAID systems, tape drives, data backup storage systems, etc.

Through the description of the above embodiments, it is easy for those skilled in the art to understand that the exemplary embodiments described here can be realized by software or by combining software with necessary hardware. The technical solutions according to the embodiments of the application may be embodied in the form of a software product, which may be stored in a non-volatile storage medium (which may be a CD-ROM, USB flash drive, mobile hard drive, etc.) or on a network, and may include several instructions to enable a computing device (which may be a personal computer, server, mobile terminal, or network device, etc.) to execute the method according to the embodiments of the application.

A software product can adopt any combination of one or more readable media. The readable medium may be a readable signal medium or a readable storage medium. The readable storage medium can be, for example, but is not limited to, an electrical, magnetic, optical, electromagnetic, infrared, or semiconductor system, apparatus or device, or a combination of any of the above. More specific examples (a non-exhaustive list) of readable storage media include: electrical connection with one or more wires, a portable disk, a hard disk, a random access memory (RAM), a read-only memory (ROM), an erasable programmable read-only memory (EPROM or flash memory), an optical fiber, a portable compact disk read-only memory (CD-ROM), an optical storage device, a magnetic storage device, or any suitable combination of the above.

The computer-readable storage medium may be a data signal propagated in a baseband or as part of a carrier wave, in which a readable program code is contained. This propagated data signal can take many forms, including but not limited to electromagnetic signal, optical signal or any suitable combination of the above. The readable storage medium may also be any readable medium other than the readable storage medium, which can send, propagate or transmit a program for use by or in combination with an instruction execution system, apparatus or device. The program code contained in the readable storage medium can be transmitted by any suitable medium, including but not limited to Wi-Fi, wire, optical cable, RF, etc., or any suitable combination of the above.

Computer program codes for performing the operations of the disclosure can be written by a combination of one or more programming languages, including object-oriented programming languages such as Java, C++, and conventional procedural programming languages such as "C" language or similar programming languages. The program code can be completely executed on user computing equipment, partially executed on user equipment, executed as an independent software package, partially executed on user computing equipment and partially executed on remote computing equipment, or completely executed on remote computing equipment or a server. In a case involving remote computing equipment, the remote computing equipment may be connected to user computing equipment through any kind of network including a local area network (LAN) or a wide area network (WAN), or may be connected to external computing equipment (e.g., connected through the Internet using an Internet service provider).

The said computer-readable medium carries one or more programs, which, when executed by the said equipment, cause the computer-readable medium to realize the aforementioned functions.

Those skilled in the art can understand that the above modules can be distributed in devices according to the description of the embodiment, or can be uniquely arranged in one or more devices of this embodiment with corresponding changes. The modules in the above embodiments can be merged into one module or further split into multiple sub-modules.

According to some embodiments of the application, an intelligent power consumption management scheme suitable for PoE is provided. By setting the PoE power-saving strategy, electronic devices such as tablet computers, notebook computers or all-in-one computers can work stably under the limited power supply capacity of PoE.

The embodiments of the application have been introduced in detail above. The above embodiments are only used to help understand the method of the application and its core ideas. The changes or deformations made by those skilled in the art based on the ideas of the application and the specific implementation and application scope of the application are within the scope of protection of the application. To sum up, the content of this specification should not be construed as a limitation of the application.

What is claimed is:

1. A system for managing device power consumption, comprising:
    a power supply mode monitor configured to monitor a power supply mode of power sourcing equipment in real time;
    a Power over Ethernet (POE) power-saving strategy configurator configured to display available power consumption and real-time power consumption data of a powered device and receive an adjustment operation instruction; and
    a PoE power consumption estimator configured to acquire a power consumption limit of the powered device, and estimate the real-time power consumption data and the available power consumption according to an adjustment target corresponding to the adjustment operation instruction provided from the PoE power-saving strategy configurator, so as to adjust device functions of the powered device;
    wherein the power supply mode monitor is further configured to control the PoE power-saving strategy configurator and the PoE power consumption estimator according to the power supply mode of the power sourcing equipment;
    wherein monitoring a power supply mode of power sourcing equipment in real time comprises:
    setting a power supply mode determination signal; and
    determining whether the power supply mode of the power sourcing equipment is a PoE mode or a non-PoE mode according to a level of the determination signal.

2. The system according to claim 1, wherein monitoring a power supply mode of power sourcing equipment in real time further comprises:
    if the power supply mode of the power sourcing equipment is a PoE mode, enabling, by the power supply mode monitor, the PoE power consumption estimator and the PoE power-saving strategy configurator; and
    if the power supply mode of the power sourcing equipment is a non-PoE mode, disabling, by the power supply mode monitor, the PoE power consumption estimator and the PoE power-saving strategy configurator.

3. The system according to claim 1, wherein the available power consumption comprises:
    first available power consumption calculated and acquired according to a power consumption limit of a PoE specification and the power consumption limit of the powered device; and
    second available power consumption estimated and acquired according to the adjustment target and the first available power consumption.

4. The system according to claim 1, wherein estimating the real-time power consumption data comprises:
    acquiring performance parameters of the powered device; and
    obtaining the real-time power consumption data of the powered device by estimation according to the performance parameters and empirical data.

5. The system according to claim 1, wherein the adjustment target comprises:
    performance adjustment of the device functions of the powered device; and/or
    on or off of the device functions of the powered device.

6. The system according to claim 1, wherein acquiring the power consumption limit of the powered device comprises:
    sending, by the powered device, an application for power allocation to the power sourcing equipment through Link Layer Discovery Protocol (LLDP) protocol; and
    acquiring power information allocated to the powered device returned from the power sourcing equipment.

7. A method for managing device power consumption based on power supply in a PoE mode, the method comprising:
    monitoring a power supply mode of power sourcing equipment in real time, and acquiring a power consumption limit of a powered device under a condition that the power supply mode of the power sourcing equipment is the PoE mode;
    receiving an adjustment operation instruction from a user, and setting an adjustment target according to the adjustment operation instruction;
    estimating available power consumption and real-time power consumption data of the powered device according to the power consumption limit of the powered device and the adjustment target; and
    adjusting device functions of the powered device based on the available power consumption and the real-time power consumption data, and displaying adjusted available power consumption and adjusted real-time power consumption data;
    wherein monitoring a power supply mode of power sourcing equipment in real time comprises:
    setting a power supply mode determination signal; and
    determining whether the power supply mode of the power sourcing equipment is a PoE mode or a non-PoE mode according to a level of the determination signal.

8. The method according to claim 7, wherein managing and displaying the device functions of the powered device comprises:
    managing the device functions of the powered device by using a default power consumption configuration; and
    setting the device functions of the powered device in the default power consumption configuration according to the available power consumption and the power consumption data of the device functions of the powered device.

9. The method according to claim 8, comprising:
enabling, with the default power consumption configuration in the PoE mode, the device functions of the powered device to a maximum extent according to the power consumption limit of the powered device; and
changing the default power consumption configuration according to changes of the powered device and the power consumption limit of the powered device.

10. The method according to claim 8, wherein the device functions of the powered device are set in descending order of the power consumption data of the device functions or according to user requirements.

11. An electronic device, comprising:
one or more processors; and
a storage apparatus configured to store one or more programs, wherein
when the one or more programs are executed by the one or more processors, the one or more processors implement following steps:
monitoring a power supply mode of power sourcing equipment in real time, and acquiring a power consumption limit of a powered device under a condition that the power supply mode of the power sourcing equipment is the PoE mode;
receiving an adjustment operation instruction from a user, and setting an adjustment target according to the adjustment operation instruction;
estimating available power consumption and real-time power consumption data of the powered device according to the power consumption limit of the powered device and the adjustment target; and
adjusting device functions of the powered device based on the available power consumption and the real-time power consumption data, and displaying adjusted available power consumption and adjusted real-time power consumption data;
wherein monitoring a power supply mode of power sourcing equipment in real time comprises:
setting a power supply mode determination signal; and
determining whether the power supply mode of the power sourcing equipment is a PoE mode or a non-PoE mode according to a level of the determination signal.

12. A non-transitory computer-readable storage medium on which a computer program is stored, wherein the program, when executed by a processor, implements the following steps:
monitoring a power supply mode of power sourcing equipment in real time, and acquiring a power consumption limit of a powered device under a condition that the power supply mode of the power sourcing equipment is the PoE mode;
receiving an adjustment operation instruction from a user, and setting an adjustment target according to the adjustment operation instruction;
estimating available power consumption and real-time power consumption data of the powered device according to the power consumption limit of the powered device and the adjustment target; and
adjusting device functions of the powered device based on the available power consumption and the real-time power consumption data, and displaying adjusted available power consumption and adjusted real-time power consumption data;
wherein monitoring a power supply mode of power sourcing equipment in real time comprises:
setting a power supply mode determination signal; and
determining whether the power supply mode of the power sourcing equipment is a PoE mode or a non-PoE mode according to a level of the determination signal.

\* \* \* \* \*